Dec. 23, 1930.  H. G. TRAVER  1,785,989
CAR FOR AMUSEMENT RIDES
Original Filed March 19, 1925
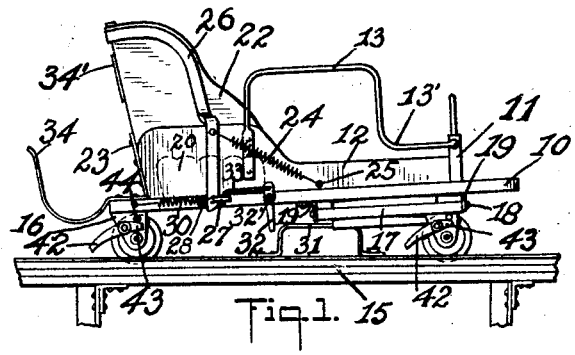
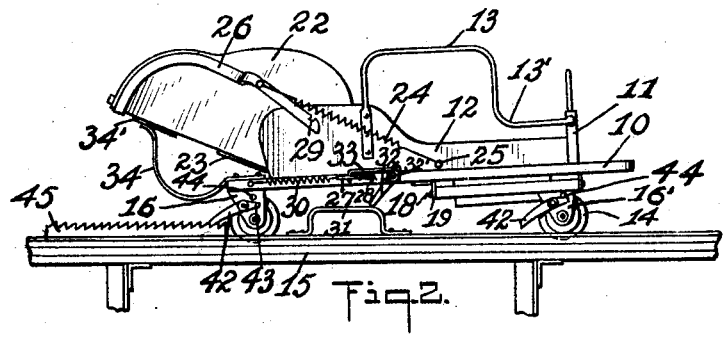
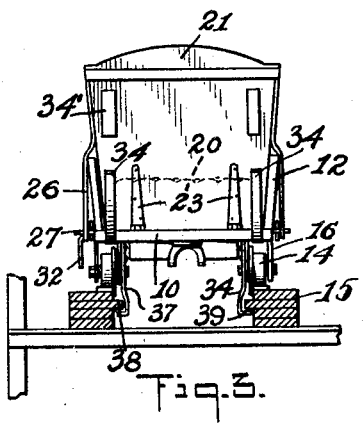
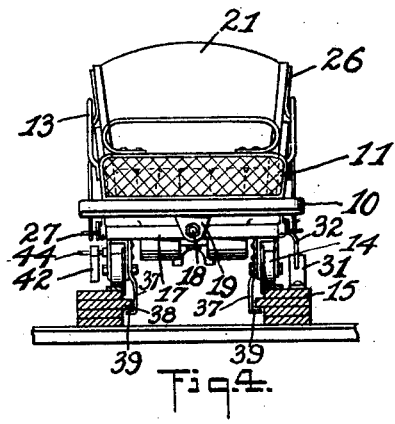
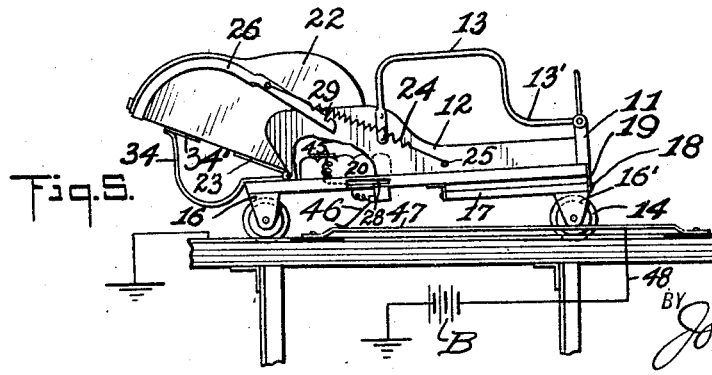
INVENTOR
H. G. Traver
BY
ATTORNEY Patented Dec. 23, 1930

1,785,989

UNITED STATES PATENT OFFICE

HARRY G. TRAVER, OF BEAVER FALLS, PENNSYLVANIA

CAR FOR AMUSEMENT RIDES

Original application filed March 19, 1925, Serial No. 16,831, now Patent No. 1,713,793, dated May 21, 1929. Divided and this application filed October 7, 1927. Serial No. 224,535.

This invention relates to passenger carrying cars for amusement rides, the subject-matter of invention of the present application having been divided out of application's application for amusement rides, filed March 19, 1925, Serial #16,831, now Patent No. 1,713,793, May 21, 1929.

It is the object of the invention to provide a passenger carrying car adapted for connection in a train of cars, each car arranged with a body carried by two traction wheel supporting trucks, the body and one truck being adapted to have movement one relative to the other on an axis extending longitudinally of the body.

Another object of the invention is to provide a car for amusement rides having a seat within the body of the car having a back rest adapted to permit a person seated in the car to assume a backward inclined position from an upright seated position, and arranged with means to normally retain the same with a person in the seat in upright seated position, and said means adapted to be released at predetermined points along a track on which the car is propelled, and means to impart movement to the person in the seat from an inclined to an upright seated position.

A further object of the invention relates to the provision of electric shocking means mounted within the car body in a normally open electric circuit adapted to be closed by means arranged at predetermined points along the track as the car rides over the same.

A still further object of the invention is to provide a car adapted for connection in a train of cars whereby the cars in a train will adjust themselves one relative to the other in travelling along sharp curves and banked portions of a track structure.

Other objects and advantages will hereinafter appear.

In the drawings accompanying and forming a part of this application, Figure 1 is a side elevation of a passenger carrying car showing an embodiment of the invention and supported on a portion of a track structure.

Figure 2 is a view similar to Figure 1, with the back rest of the car in inclining or rearward tilted position.

Figure 3 is a view looking at the back of the car with the back rest in upright position.

Figure 4 is a view looking at the front of the car; and

Figure 5 is a view similar to Figure 2 partly broken away to show an electric shocking means carried by the car and the connecting thereof to a source of electricity.

Similar characters of reference designate like parts throughout the different views of the drawings.

In the embodiment of the invention shown, the car embodies a body portion 10 made of wood or sheet metal having a front 11, sides 12 higher at the rear of the car than the front and hand rails 13 mounted on the sides 12 and front 11 of the car, the forward end being arranged, as at 13' to permit of the entrance or exit of passengers. The car is arranged with flanged wheels 14 at the forward and rearward ends, which flanges are arranged at the inner sides of track rails 15 upon which the car is propelled. The rear wheels are rotatably carried by separate supports comprising U-shaped brackets 16 and fixed to the bottom of the car body. The car is adapted to be propelled in a train of cars along a track structure arranged with banked curved portions and the cars are arranged to adjust themselves one relative to the other in passing from a straight and unbanked portion of the track to a curved and banked portion thereof and from the latter to a straight portion of the track. In order to accomplish this the car body is supported upon the front wheels in a manner whereby said wheels and the car body may have adjustment relative to each other on an axis extending longitudinally and preferably centrally of the car. For this purpose the forward wheels are rotatably carried by U-shaped brackets 16', similar to brackets 16 carrying the rear wheels, mounted at one end, to constitute the forward end, of a truck 17 of rectangular open frame structure on which the car is pivotally mounted at the ends by pins 18 engaging openings in brackets 19 fixed to the bottom and centrally of the car body.

The car is provided at the rear portion with a seat 20 arranged with a back 21 having integral side wings 22 engaging within the sides 12, said seat back being pivotally supported upon the car body, as by hinges 23, to permit the seat back to have a limited backward tilting movement. The seat back is urged to its forward and back supporting position by springs 24 at opposite sides thereof, one end of the springs being connected to the car, as at 25, and the other end to arms 26 secured to the back wings, and the free ends of the arms being arranged to engage at the outer surface of the car sides 12. The seat back is releasably secured in back supporting position by a locking bar 27 slidably carried in elongated slots 28 arranged in the sides of the body to extend transversely of the car body with the ends of the bar extending beyond the sides of the body to engage a notch 29 in each arm 26, the bar being urged in a direction to engage the arm notches by springs 30 fixed at one end to the ends of the bar and the other end to the car body, the ends of the arm being adapted to automatically engage in the arm notches by rounding or bevelling the ends 26 of the arms, which ends as the seat back is moved to back supporting position engage the ends of the bar and move the same against the tension of the bar springs 30. The seat back is adapted to be automatically released and caused to be tilted backward by the weight of a passenger seated in the car at a predetermined point in the ride to thereby impart a thrill to the passenger. For this purpose an abutment in the form of a U-shaped member 31 is fixed upon the track and adapted to be engaged by a trigger 32 as the car is propelled along the track, said trigger being in the form of an arm fixed to a rock shaft 32' extending parallel to the latch bar 27, said rock shaft being rotatably carried at the ends by the car body. The ends of the shaft 32' extend beyond the sides of the car body and have a link connection 33 with the trigger so that the engagement of the trigger by the abutment 31 will release the connection of the ends of the latch bar with the arm notches 29 allowing the back rest to have backward movement on the hinges 23. The backward movement of the back rest is limited by a yielding abutment in the form of a pair of resilient members 34 of curved or bowed form secured at one end to the car body to extend rearwardly and upwardly. As the seat back is released and it is moved backward, contact plates 34' carried by the back will yieldingly engage the free ends of said resilient arms which will be slightly stressed downward against their inherent tension, and as the abutments reach the terminus of this stressing movement the inherent tension or rebound of these springs to return to their initial position will assist the springs 24 to return the seat-back to its normal back supporting position.

To prevent the cars from jumping the tracks arms 37 are fixed to the wheel trucks to extend downward and to engage at the side of projecting portions 38 of the track rails 15 with the free ends of said arms arranged with an angle portion 39 to engage below and extend parallel to the bottom of the track projections 38 and normally out of engagement therewith while the wheels of the car have track engagement with the track, but during the travel of the cars on a banked curved portion of the track the wheels on the elevated side of the car will have a tendency to leave the track and the turning over of the car will be prevented by the engagement of the angle portion with the projecting track portion 38.

To prevent the cars from going backwards on any of the rises in the track structure, pawls 42 are pivotally mounted on the outer wall of the wheel-carrying brackets 16, 16', and have limited downward movement by an extension 43 thereof abutting against a pin 44 carried by each bracket adjacent the pivotal mounting of the pawl. The rises or inclined portions of the track are arranged with ratchet bars 45 mounted on the top of the rails 15 over which the pawls ride during the forward movement of the cars, the pawls engaging with the teeth of the ratchet bars by gravity and holding the car against backward movement should the cars come to a stop. This pawl and ratchet mechanism may also serve as a noise maker during the forward movement of the cars.

To provide another mirth provoking novelty means are provided to electrically shock the passengers while in the cars at some point during the ride, which means comprises a current conducting member arranged upon the seat of the car, as shown at 45 in Figure 5 adapted to be grounded in the car body and connected to a contact maker 46 in the form of a resilient finger arranged at the side of the car and adapted for sliding contact with a contact member 47 in the form of a rail of conducting material mounted upon and insulated from the track rail 15 and connected by a conductor 48 to a source of electricity, as the one terminal of a battery B, the other terminal of the battery being grounded in the metallic track structure and completing the electric circuit through the wheels of the cars to the member 45 when the finger 46 is in contact with the contact member 47.

Having thus described my invention I claim:

1. In a passenger car for amusement rides, a body arranged with a seat, a back rest for the seat adapted to be tilted rearward and normally urged to back supporting position and releasable means to retain the back rest in back supporting position, and adapted to be released to permit the seat back to be tilted backward and a passenger in the car to assume a backward reclining position.

2. In a passenger car for amusement rides, a body arranged with a seat, a pivotally supported back rest for the seat normally yieldingly urged to back supporting position and adapted to be tilted backward from said back supporting position, and releasable means to retain the back rest in back supporting position.

3. In a passenger car for amusement rides, a body arranged with a seat, a pivotally supported back rest for the seat normally yieldingly urged to back supporting position and adapted to be tilted backward from said back supporting position, means to releasably retain the back rest in back supporting position, and an abutment carried by the body for engagement with said back to limit the backward tilting movement thereof.

4. In a passenger car for amusement rides, a body arranged with a seat, a pivotally supported back rest for the seat normally yieldingly urged to back supporting position and adapted to be tilted backward from said back supporting position, arms carried by the back to engage at opposite sides of the body, and latches yieldingly urged in a direction toward and to co-operate with said arms to retain the back in back supporting position.

5. In a passenger car for amusement rides, a body arranged with a seat, a back rest for the seat pivotally mounted on the body, springs to urge said back rest to back supporting position, said back rest being adapted to be tilted backward from said position against the tension of the springs, and a resilient abutment carried by the body to arrest the backward movement of the back rest and the rebound of said abutment adapted to assist the springs in moving the back rest to back supporting position.

6. In a passenger car for amusement rides, a body having a seat and arranged with hand rails at opposite sides thereof, a pivotally supported back rest for the seat arranged with integral seat wings and notched arms to engage at opposite sides of the body, springs to urge said back rest to back supporting position, and latches slidably mounted on the body to engage in the notches of the arms to releasably retain the back rest in back supporting position.

7. In a passenger car for amusement rides, a seat arranged with a back rest adapted to be tilted backward, arms connected with the back rest and engaging at opposite sides of the car yieldingly urged to back supporting position, a latch to co-operate with the arms to retain the back rest in back supporting position, and latch releasing means carried by the car adapted for engagement with abutments arranged along a track as the car moves along said track.

Signed at Beaver Falls, in the county of Beaver and State of Pennsylvania, this 31st day of September, 1927.

HARRY G. TRAVER.